United States Patent [19]

Michelet et al.

[11] 4,298,247

[45] Nov. 3, 1981

[54] THICK OPTICAL ELEMENT HAVING A VARIABLE CURVATURE

[75] Inventors: Guy Michelet, Paris; Jean-Pierre Treton, Ste Genevieve des Bois, both of France

[73] Assignee: Quantel S.A., Orsay, France

[21] Appl. No.: 136,266

[22] Filed: Apr. 1, 1980

[30] Foreign Application Priority Data

Apr. 4, 1979 [FR] France .............................. 79 08451

[51] Int. Cl.$^3$ ............................................. G02B 5/10
[52] U.S. Cl. ..................................... 350/295; 350/360
[58] Field of Search ........................ 350/295, 360, 6.6

[56] References Cited

FOREIGN PATENT DOCUMENTS 2817239 11/1978 Fed. Rep. of Germany ...... 350/295
2817525 7/1979 Fed. Rep. of Germany ...... 350/360
2389143 11/1978 France.

Primary Examiner—Jon W. Henry
Attorney, Agent, or Firm—Holman & Stern

[57] ABSTRACT

The optical element comprises a first bimorph structure, at least one of the components of which is made from piezoelectric material and supply electrodes for the bimorph structure. The element further comprises at least one reinforcing piezoelectric bimorph structure provided with supply electrodes. The latter are respectively connected to the electrodes of the first bimorph structure. An element of the reinforcing bimorph structure is placed against a corresponding element of the first bimorph structure and fixed thereto by a layer of an elastic material. The latter has a tensile strength which is low relative to that of the elements constituting the bimorph structures of piezoelectric material.

10 Claims, 2 Drawing Figures

THICK OPTICAL ELEMENT HAVING A VARIABLE CURVATURE

DESCRIPTION

The present invention relates to optical elements having a variable curvature made from piezoelectric ceramic bimorph structures.

Such optical elements, and the optical systems of which they are part, have been disclosed in U.S. patent application Nos: 896,081 filed Apr. 13, 1978, 896,079, filed Apr. 13, 1981, and 32,932 filed Apr. 24, 1979, which are owned by Applicants' assignee.

Bimorph structures of ceramic material which are part of the construction of these elements and optical systems are made from thin piezoelectric ceramic elements so that their overall thickness is of the order of 1 mm.

As soon as the area of such bimorph structures exceeds certain limits, the bimorph structures, then also called bimorph plate structures, become subject to deformations which are difficult to avoid and create machining difficulties.

It is moreover not easy to control with precision the modifications of curvature of a thin element having a large area.

Consequently, the optical elements having a variable curvature produced up to the present time have relatively small areas, which constitutes a serious drawback in the case of, for example, mirrors.

An object of the invention is to overcome the aforementioned drawbacks and to provide an optical element having a variable curvature whose rigidity is sufficient to permit giving the desired area to the element without decreasing its curvature variation capability.

According to the invention there is provided an optical element having a variable curvature comprising a first bimorph structure, at least one of the components of which structure is made from a piezoelectric material, and electrodes for supplying current to said bimorph structure, wherein there is further provided at least one reinforcing piezoelectric bimorph structure provided with supply electrodes respectively connected to the electrodes of the first bimorph structure, one element of which reinforcing bimorph structure being placed against a corresponding element of the first bimorph structure and fixed to the latter by means of a layer of elastic material having a tensile strength which is low relative to the tensile strength of the elements constituting the bimorph structures of piezoelectric material.

Further features of the invention will be apparent from the ensuing description.

In the drawing, given solely by way of example:

Figure 1:
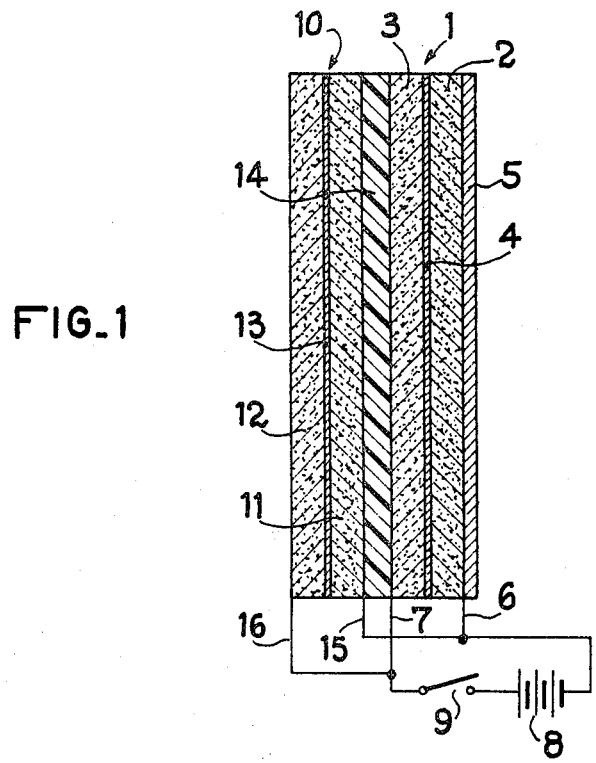
FIG. 1 is a sectional view of an optical element according to the invention, in the non-excited state.

In FIG. 1, the invention is assumed to be applied to a mirror having a variable focal length.

This mirror comprises a first bimorph structure 1 consisting of two elements 2 and 3 of piezoelectric ceramic material which are assembled by means of a layer 4 of an adhesive material.

The free face of the element 2 carries a layer 5 of reflecting material.

Electrodes 6 and 7 enable a voltage to be connected across the elements 2 and 3 of the bimorph structure 1 from a source of dc voltage 8 connected in series with a switch 9.

In order to increase the mechanical stiffness of the optical element constructed in this way, a second reinforcing bimorph structure 10 consisting of two elements 11 and 12 of piezoelectric ceramic material interconnected by a layer 13 of adhesive material, is fixed against the free face of the element 3 of the first bimorph structure by means of a layer 14 having a low tensile strength. This material may be formed for example by an elastomer.

The elements 11 and 12 of the second bimorph structure 10 are also connected to the terminals of the source of voltage 8 through electrodes 15, 16.

The layer of material 14 may also be an adhesive, a weld or other material.

The electric connections between the source of voltage 8 and the elements of the bimorph structures 1 and 10 are produced in accordance with the directions of the polarizations in the ceramic materials of these elements.

The bimorph structures are associated in such manner that, under the effect of the voltage of the source 8, their concavities face in the same direction.

In order to achieve optimum performance, the bimorph structures 1 and 10 must be preferably identical.

Figure 2:
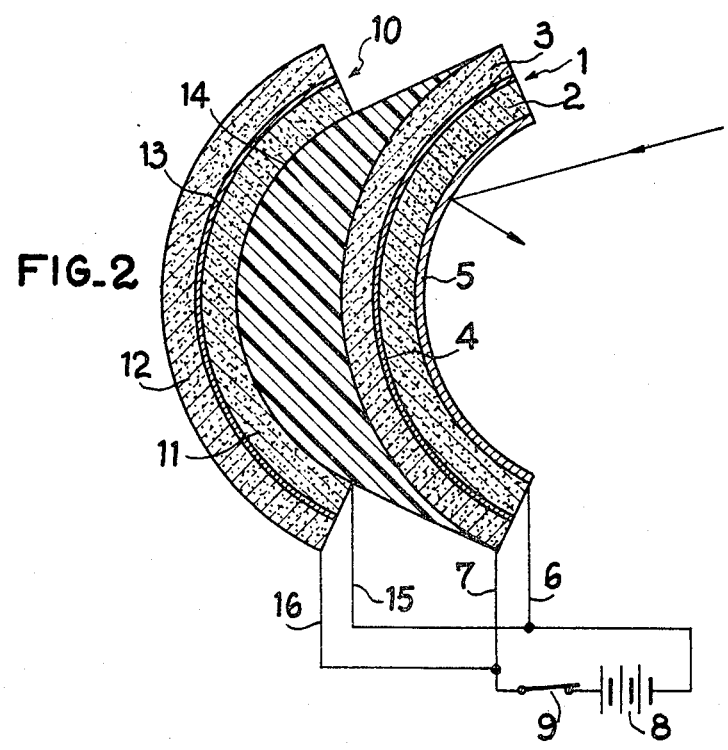
FIG. 2 is a sectional view of the optical element of FIG. 1 in the excited state.

Upon the application of the voltage of the source 8 across the bimorph structures 1 and 10, by the closure of the switch 9, the optical element assumes the shape shown in FIG. 2. It will be understood that the thicknesses of the various components of the optical element have been exaggerated in order to render the illustration more clear.

It will be observed that the layer 14 of material having a low tensile strength only very slightly opposes the deformation of the bimorph structures 1 and 10, so that the first bimorph structure undergoes practically the same variations as if it were alone.

In the embodiment just described, the mirror having a variable focal length comprises two bimorph structures.

However, it will be understood that the number of bimorph structures united by layers of a material having a low tensile strength is not limited to two.

Let it be assumed by way of example that there has been constructed a mirror having a variable curvature which is 100 mm in diameter, and 30 mm in thickness.

This mirror comprises bimorph structures which are assembled with each other by layers of elastic material having a low tensile strength, for example formed by a silicone elastomer manufactured and sold by the firm Plastigem under the reference TECSIL 2034.

It is found that the variation in the curvature of such a mirror, for a given variation in the electric field in each bimorph structure from which it is made, is 2% less than that of a mirror constituted by a bimorph structure which has a diameter of 100 mm and a thickness of 0.7 mm.

The general relation which gives the curvature of a piezoelectric bimorph structure is:

$$(1/R) = (K \, d_{31}/e) \cdot E$$

wherein $K$ = a coefficient which depends on the type of bimorph structure $d_{31}$ = the piezoelectric constant $e$ = thickness of the bimorph structure $E$ = the electric field.

The general relation which gives the curvature of a system comprising $n_b$ bimorph structures is:

$$(1/R) = (1/K) \cdot (d_{31}/e) \cdot E \cdot [1 - (n_b - 1) \cdot (2e_c \cdot Y_c)/(e Y_p)]$$

wherein $n_b$ = number of bimorph plate structures $e_c$ = thickness of the connection having a low tensile strength $Y_c$ = the modulus of elasticity of the connection $Y_p$ = the modulus of elasticity of the piezoelectric material.

The modulus of elasticity characterizes in fact the tensile strength of the considered material.

The mirror having a thickness of 30 mm and a diameter of 100 mm comprises:

30 bimorph structures having a thickness of 0.7 mm 29 connections having a thickness of 0.4 mm $Y_c = 6.10^6$ da N·m$^{-2}$ $Y_p = 6.10^9$ da N·m$^{-2}$ Under identical conditions of excitation, a single bimorph structure assumes a curvature $(1/R) = (Kd_{31}/e) \cdot E$ The system comprising 30 bimorph structures assumes a curvature $(1/R) = (Kd_{31}/e) \cdot E \times 0.982$ The difference between the curvatures of the two systems is therefore 1.8%.

In the present example, the ratio $(Y_c/Y_p)$ between the modulus of elasticity of the connecting material and that of the piezoelectric material is $10^{-3}$. However, this ratio may assume any value between $10^{-1}$ and $10^{-4}$.

Owing to the arrangement of the invention, an optical element having a variable curvature may be rendered sufficiently thick with no marked modification in its possiblities of variation of curvature, so that it is possible to construct optical elements of large area and of such mechanical stiffness that they undergo no deformation other than that produced by their excitation.

Such optical elements moreover have the advantage of being able to undergo mechanical surface treatments, such as polishing, without deforming under the action of the tool.

In the embodiment shown in the drawing, the invention is applied to a mirror, but it will be easily understood that it is applicable to any optical element or system made from piezoelectric bimorph structures.

Having now described out invention, what we claim as new and desired to secure by Letters Patent is:

1. An optical element having a variable curvature and optical properties which vary as a function of that curvature, said element comprising a first bimorph structure which has at least one component member which is made from a piezoelectric material, first electrodes for applying a voltage to said bimorph structure to vary its curvature, at least one reinforcing piezoelectric bimorph structure, second electrodes for applying a voltage to the reinforcing bimorph structure and respectively connected to the first supply electrodes, the reinforcing bimorph structure having a component member adjacent a corresponding component member of the first bimorph structure, and a layer of elastic material which interconnects said adjacent component members and has a tensile strength which is low relative to the tensile strength of component members constituting the bimorph structures of piezoelectric material.

2. An element as claimed in claim 1, wherein said first bimorph structure and said reinforcing bimorph structure are identical.

3. An element as claimed in claim 1, wherein the ratio between the tensile strength of the material of said connecting layer and the tensile strength of the material of the piezoelectric elements is between $10^{-1}$ and $10^{-4}$.

4. An element as claimed in claim 1, 2 or 3, wherein said material of low tensile strength is an elastomer.

5. An element as claimed in claim 1, 2 or 3, wherein said material of low tensile strength is an adhesive.

6. An element as claimed in claim 1, 2 or 3, wherein said material of low tensile strength is a weld.

7. An element as claimed in claim 1, 2 or 3, comprising a plurality of reinforcing bimorph structures connected to the first bimorph structure and to each other by connecting layers of material having a tensile strength which is low relative to the tensile strength of the piezoelectric component members.

8. An element as claimed in claim 7, wherein said material of low tensile strength is an elastomer.

9. An element as claimed in claim 7, wherein said material of low tensile strength is an adhesive.

10. An element as claimed in claim 7, wherein said material of low tensile strength is a weld.

* * * * *